US012608763B2

(12) United States Patent
Chen et al.

(10) Patent No.: US 12,608,763 B2
(45) Date of Patent: Apr. 21, 2026

(54) GENERATING A HIGH RESOLUTION IMAGE FROM A LOW RESOLUTION IMAGE FOR BLIND SUPER-RESOLUTION

(71) Applicant: MEDIATEK INC., Hsin-Chu (TW)

(72) Inventors: Po-Yu Chen, Hsinchu City (TW);
Yu-Syuan Xu, Hsinchu City (TW);
Ching-Chun Huang, Hsinchu City
(TW); Wei-Chen Chiu, Hsinchu City
(TW); Hsuan Yuan, Hsinchu City
(TW); Shao-Yu Weng, New Taipei City
(TW)

(73) Assignee: MEDIATEK INC., Hsinchu City (TW)

( * ) Notice: Subject to any disclaimer, the term of this
patent is extended or adjusted under 35
U.S.C. 154(b) by 234 days.

(21) Appl. No.: 18/224,564

(22) Filed: Jul. 20, 2023

(65) Prior Publication Data

US 2024/0029201 A1     Jan. 25, 2024

Related U.S. Application Data

(60) Provisional application No. 63/369,082, filed on Jul.
22, 2022.

(51) Int. Cl.
G06T 3/4084 (2024.01)
G06T 3/4046 (2024.01)
(Continued)
(52) U.S. Cl.
CPC .......... G06T 3/4076 (2013.01); G06T 3/4046
(2013.01); G06T 3/4053 (2013.01);
(Continued)
(58) Field of Classification Search
CPC ................. G06T 3/4076; G06T 3/4053; G06T
2207/20064; G06T 2207/20076; G06T
2207/20081; G06T 2207/20084
See application file for complete search history.

(56) References Cited

U.S. PATENT DOCUMENTS 9,288,395 B2    3/2016  Baer
2011/0032413 A1*  2/2011  Kulkarni ................ G03B 13/36
348/E5.045
(Continued)

FOREIGN PATENT DOCUMENTS

CN      104769934 B    4/2018
CN      113421190 A    9/2021
(Continued)

OTHER PUBLICATIONS

Zhang, K., Zuo, W., & Zhang, L. (2018). Learning a single
convolutional super-resolution network for multiple degradations.
In Proceedings of the IEEE conference on computer vision and
pattern recognition (pp. 3262-3271). (Year: 2018).*
(Continued)

*Primary Examiner* — Stephen R Koziol
*Assistant Examiner* — Ashley Hytrek
(74) *Attorney, Agent, or Firm* — Winston Hsu

(57) ABSTRACT

A method for generating a high resolution image from a low
resolution image includes retrieving a plurality of low
resolution image patches from the low resolution image,
performing discrete wavelet transform on each low resolu-
tion image patch to generate a first image patch with a high
frequency on a horizontal axis and a high frequency on a
vertical axis, a second image patch with a high frequency on
the horizontal axis and a low frequency on the vertical axis,
and a third image patch with a low frequency on the
horizontal axis and a high frequency on the vertical axis,
inputting the three image patches to a dual branch degrada-
tion extractor to generate a blur representation and a noise
representation, and performing contrastive learning on the
blur representation and the noise representation by reducing
a blur loss and a noise loss.

11 Claims, 4 Drawing Sheets

100

102

LR

(51) Int. Cl.

| | | |
|---|---|---|
| *G06T 3/4053* | (2024.01) | |
| *G06T 3/4076* | (2024.01) | |
| *G06T 5/10* | (2006.01) | |
| *G06T 5/50* | (2006.01) | |
| *G06T 5/70* | (2024.01) | |

(52) U.S. Cl.

CPC .............. *G06T 3/4084* (2013.01); *G06T 5/10* (2013.01); *G06T 5/50* (2013.01); *G06T 5/70* (2024.01); *G06T 2207/20064* (2013.01); *G06T 2207/20076* (2013.01); *G06T 2207/20081* (2013.01); *G06T 2207/20084* (2013.01)

(56) References Cited

U.S. PATENT DOCUMENTS

| | | | |
|---|---|---|---|
| 2020/0034948 A1 | 1/2020 | Park | |
| 2020/0226718 A1 | 7/2020 | Reddy | |
| 2020/0364556 A1 | 11/2020 | Irani | |
| 2022/0122223 A1* | 4/2022 | Choi | G06T 5/70 |
| 2022/0138500 A1 | 5/2022 | Levinshtein | |
| 2024/0185386 A1 | 6/2024 | Pan | |

FOREIGN PATENT DOCUMENTS

| | | |
|---|---|---|
| CN | 114202460 A | 3/2022 |
| CN | 114494015 A | 5/2022 |
| TW | 202105241 A | 2/2021 |

OTHER PUBLICATIONS

Liu, P., Zhang, H., Lian, W., & Zuo, W. (2019). Multi-level wavelet convolutional neural networks. IEEE Access, 7, 74973-74985. (Year: 2019).*

Cornillere, V., Djelouah, A., Yifan, W., Sorkine-Hornung, O., & Schroers, C. (2019). Blind image super-resolution with spatially variant degradations. ACM Transactions on Graphics (TOG), 38(6), 1-13. (Year: 2019).*

Wang, L., Wang, Y., Dong, X., Xu, Q., Yang, J., An, W., & Guo, Y. (2021). Unsupervised degradation representation learning for blind super-resolution. In Proceedings of the IEEE/CVF conference on computer vision and pattern recognition (pp. 10581-10590). (Year: 2021).*

Zhang, J., Lu, S., Zhan, F., & Yu, Y. (2021). Blind image super-resolution via contrastive representation learning. arXiv preprint arXiv:2107.00708. (Year: 2021).*

Choi, Y. J., Lee, Y. W., & Kim, B. G. (2021, January). Wavelet attention embedding networks for video super-resolution. In 2020 25th International conference on pattern recognition (ICPR) (pp. 7314-7320). IEEE. (Year: 2021).*

Zou, W., Chen, L., Wu, Y., Zhang, Y., Xu, Y., & Shao, J. (2022). Joint wavelet sub-bands guided network for single image super-resolution. IEEE Transactions on Multimedia, 25, 4623-4637. (Year: 2022).*

Luo, Z., Huang, H., Yu, L., Li, Y., Fan, H., & Liu, S. (2022). Deep constrained least squares for blind image super-resolution. In Proceedings of the IEEE/CVF conference on computer vision and pattern recognition (pp. 17642-17652). (Year: 2022).*

Zhou, Y., Lin, C., Luo, D., Liu, Y., Tai, Y., Wang, C., & Chen, M. (2022, October). Joint learning content and degradation aware feature for blind super-resolution. In Proceedings of the 30th ACM international conference on multimedia (pp. 2606-2616). (Year: 2022).*

Yin, P., Liu, Z., Wu, D., Huo, H., Wang, H., & Zhang, K. (2022). Unsupervised simple Siamese representation learning for blind super-resolution. Engineering Applications of Artificial Intelligence, 114, 105092. (Year: 2022).*

Liang, "SwinIR: Image Restoration Using Swin Transformer", IEEE, Aug. 23, 2021.

Wang, "Unsupervised Degradation Representation Learning for Blind Super-Resolution", IEEE, Apr. 1, 2021.

Bell-Kligler, "Blind Super-Resolution Kernel Estimation using an Internal-GAN", NIPS'19, Jan. 7, 2020.

Luo, "Deep Constrained Least Squares for Blind Image Super-Resolution", IEEE, Mar. 25, 2022.

Chen, "Learning Continuous Image Representation with Local Implicit Image Function", IEEE, Apr. 1, 2021.

Skorokhodov, "Adversarial Generation of Continuous Images", IEEE, Jun. 28, 2021.

Mehta, "Modulated Periodic Activations for Generalizable Local Functional Representations", IEEE, Apr. 8, 2021.

Zhou, "Joint Learning Content and Degradation Aware Embedding for Blind Super-Resolution", Proceedings of the 30th ACM International Conference on Multimedia, Aug. 29, 2022.

Xu, the specification, including the claims, and drawings in the U.S. Appl. No. 18/218,017, filed Jul. 4, 2023.

Ying Fu et al., Residual scale attention network for arbitrary scale image super-resolution, Neurocomputing 427, 2021, Elsevier, pp. 201~211.

Xuecai Hu et al., Meta-SR: A magnification-arbitrary network for super-resolution, In Proceedings of the IEEE/CVF conference on computer vision and pattern recognition, 2019, pp. 1575~1584.

Xu, the specification, including the claims, and drawings in the U.S. Appl. No. 19/420,658 , Filing Date: Dec. 15, 2025.

* cited by examiner

GENERATING A HIGH RESOLUTION IMAGE FROM A LOW RESOLUTION IMAGE FOR BLIND SUPER-RESOLUTION

CROSS REFERENCE TO RELATED APPLICATIONS

This application claims the benefit of U.S. Provisional Application No. 63/369,082, filed on Jul. 22, 2022. The content of the application is incorporated herein by reference.

BACKGROUND

Deep Neural Networks (DNNs) have achieved remarkable results on single image super resolution (SISR). The goal of SISR is to reconstruct high-resolution (HR) images from their corresponding low-resolution (LR) images. Despite its success, many of the proposed approaches handle SISR based on pre-defined depredation (e.g. bicubic downsampling) and noiseless low resolution images. However, degradation of a low resolution image is unknown in real world. To handle various unknown degradations, upsampling LR images with degradation estimation is more practical. Therefore, a normalized principal component analysis on degradation representation for blind super-resolution is proposed in this invention to solve the current problem.

SUMMARY

A method for generating a high resolution image from a low resolution image includes retrieving a plurality of low resolution image patches from the low resolution image, performing discrete wavelet transform on each low resolution image patch to generate a first image patch with a high frequency on a horizontal axis and a high frequency on a vertical axis, a second image patch with a high frequency on the horizontal axis and a low frequency on the vertical axis, and a third image patch with a low frequency on the horizontal axis and a high frequency on the vertical axis, inputting the first image patch, the second image patch and the third image patch to a dual branch degradation extractor to generate a blur representation and a noise representation, performing contrastive learning on the blur representation and the noise representation by reducing a blur loss and a noise loss.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
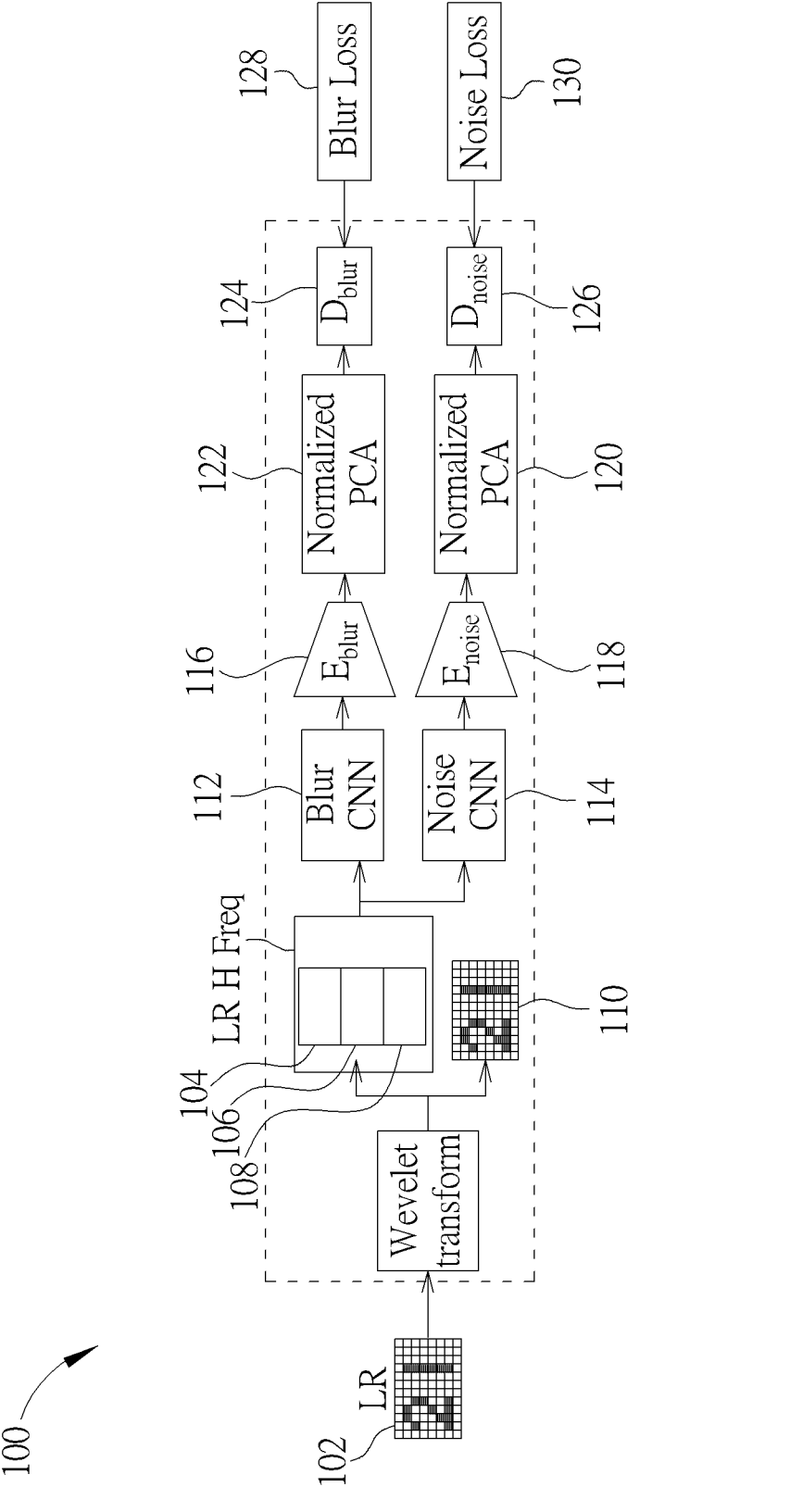
FIG. 1 is a block diagram of a dual branch degradation extractor according to an embodiment of the present invention.

FIG. 1 is a block diagram of a dual branch degradation extractor 100 according to an embodiment of the present invention. When a low resolution image 102 is inputted to the dual branch degradation extractor 100, a wavelet transform is performed on the low resolution image 102 to generate a first image patch 104 with a high frequency on a horizontal axis and a high frequency on a vertical axis, a second image patch 106 with a high frequency on the horizontal axis and a low frequency on the vertical axis, a third image patch 108 with a low frequency on the horizontal axis and a high frequency on the vertical axis, and a fourth image patch 110 with a low frequency on the horizontal axis and a low frequency on the vertical axis. The first image patch 104, the second image patch 106 and the third image patch 108 are inputted to a blur convolution neural network (blur CNN) 112 and a noise convolution neural network (noise CNN) 114 to generate a blur degradation embedding 116 and a noise degradation embedding 118, respectively.

The blur degradation embedding ($E_{blur}$) 116 is inputted to a multilayer perceptron (MLP) of a normalized principle component analysis (PCA) 122 to generate a blur query vector. The blur query vector is normalized to generate a normalized blur query vector as follow:

$$Q = \text{normalized}(\text{MLP}(E_{blur}))$$

A codebook degradation representation is inputted to the multilayer perceptron (MLP) of the normalized PCA 122 to generate a blur codebook vector. The blur codebook vector is normalized to generate a normalized blur codebook vector, wherein the normalization is along one dimension as follows:

$$K = \text{normalized}(\text{MLP}(Cb), \text{dim}=1)$$

A softmax activation function is performed on a dot product of the normalized blur query vector and a transpose of the normalized blur codebook vector to generate a blur probability vector. A dot product is performed on the blur probability vector and the blur codebook vector to generate the blur representation ($D_{blur}$) 124 as follows:

$$D_{blur} = \text{softmax}(Q \cdot K^T) \cdot Cb$$

The noise degradation embedding ($E_{noise}$) 118 is inputted to a multilayer perceptron (MLP) of a normalized principle component analysis (PCA) 120 to generate a noise query vector. The noise query vector is normalized to generate a normalized noise query vector as follows:

$$Q = \text{normalized}(\text{MLP}(E_{noise}))$$

A codebook degradation representation is inputted to the multilayer perceptron (MLP) of the normalized principle component analysis (PCA) 120 to generate a noise codebook vector. The noise codebook vector is normalized to generate a normalized noise codebook vector, wherein the normalization is along one dimension as follows:

$$K = \text{normalized}(\text{MLP}(Cb), \text{dim}=1)$$

A softmax activation function is performed on a dot product of the normalized noise query vector and a transpose of the normalized noise codebook vector to generate a noise probability vector. A dot product is performed on the noise probability vector and the noise codebook vector to generate the noise representation ($D_{noise}$) 126 as follows:

$$D_{noise} = \text{softmax}(Q \cdot K^T) \cdot Cb$$

In the dual branch degradation extractor 100, the contrastive learning is performed on the blur representation 124 and the noise representation 126 by reducing a blur loss 128 and a noise loss 130. In some embodiments, reducing the blur loss 128 and the noise loss 130 is minimizing the blur loss 128 and the noise loss 130.

In training stage, the low resolution image 102 is cut into a plurality of low resolution image patches to be inputted to the dual branch degradation extractor 100, and the contrastive learning is performed on the blur representation 124 and the noise representation 126 by reducing the blur loss 128 and the noise loss 130. On the other hand, in inference stage, the entire low resolution image 102 is directly inputted to the dual branch degradation extractor 100 to obtain inference results.

Figure 2:
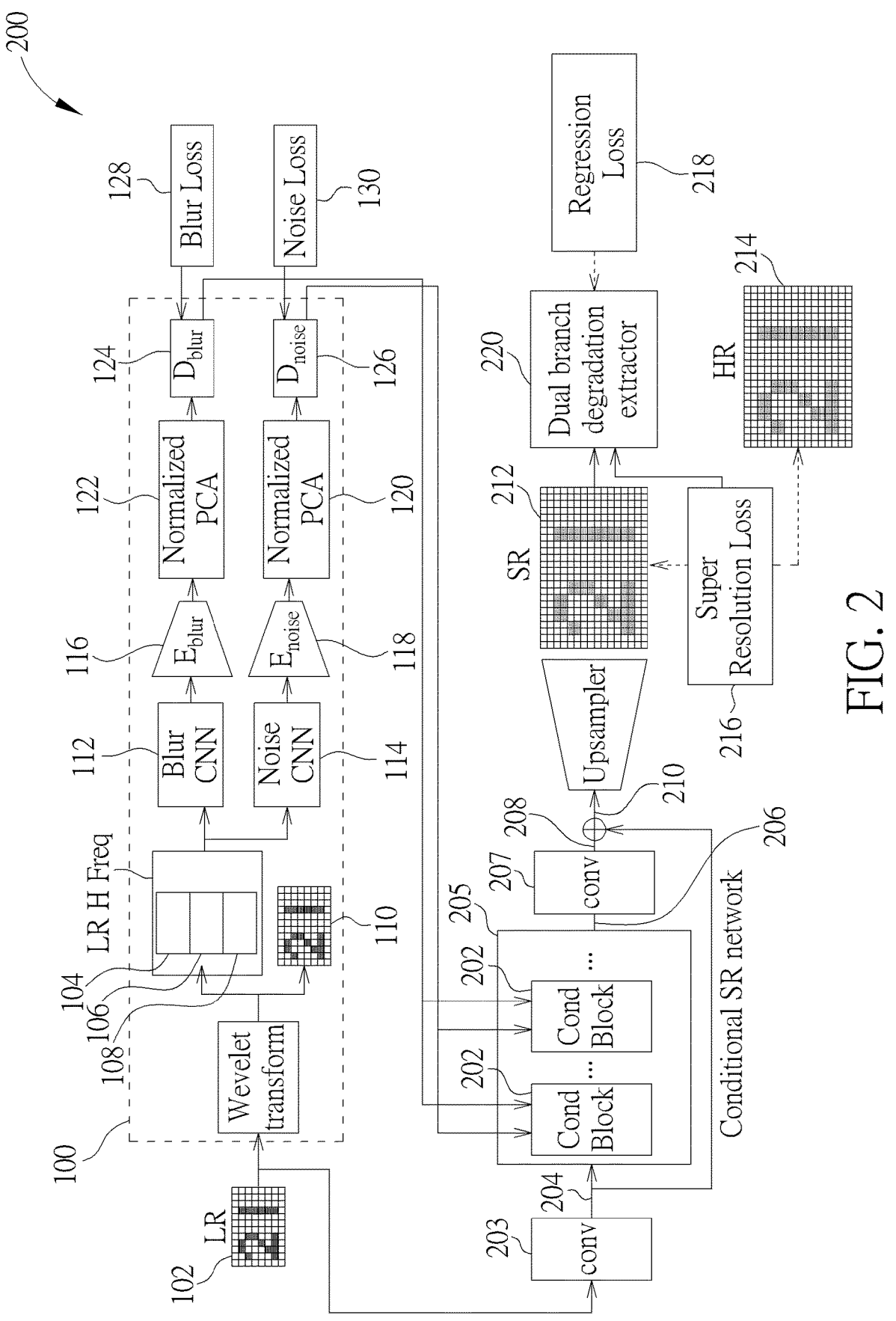
FIG. 2 is a block diagram of a dual branch super resolution network according to an embodiment of the present invention.

FIG. 2 is a block diagram of a dual branch super resolution network 200 according to an embodiment of the present invention. The low resolution image 102 is inputted to a convolution layer 203 to generate a first tensor 204. The blur representation 124, the noise representation 126, and the first tensor 204 are inputted to conditional blocks 202 of a conditional super resolution network 205 to generate a second tensor 206. The second tensor 206 is inputted to a convolution layer 207 to generate a third tensor 208. The first tensor 204 and the third tensor 208 are added together to generate a fourth tensor 210. The fourth tensor 210 is upsampled to generate a super resolution image 212. The super resolution image 212 is compared with a high resolution image 214 to generate a super resolution loss 216. In the dual branch super resolution network 200, the learning of the model is performed by reducing the super resolution loss 216. The super resolution image 212 and the high resolution image 214 are inputted to a fixed dual branch degradation extractor 220 to estimate a regression loss 218. In some embodiments, reducing the super resolution loss 216 is minimizing the super resolution loss 216.

Degradation extraction in the wavelet domain is proposed. Unlike prior art methods that typically involve feeding the low-resolution (LR) image 102 directly into a degradation extractor, the proposed approach takes a different route. The embodiment recognizes that most of the fine details and textures in an image reside in its high-frequency components of the image patches 104, 106, 108, which are also the parts most affected by noise representation 126 and blur representation 124. Consequently, the embodiment implements the wavelet transform to extract only the high-frequency components of the image patches 104, 106, 108 and use them as inputs for the blur convolution neural network 112 and a noise convolution neural network 114. Analysis in the wavelet domain (i.e., specifically high-frequency components of the image patches 104, 106, 108) makes our convolution neural networks 112, 114 more flexible in identifying the differences between blur and noise factors. Accordingly, the dual degradation can be efficiently separated from the image content and obtain more accurate degradation representations 124, 126, ultimately leading to improved super-resolution performance.

FIG. 1 illustrates the architecture of the dual branch degradation extractor 100, which is designed to extract and disentangle the degradation factors, involving blur and noise components, from a low-resolution (LR) input image 102. The extraction network comprises two branches, working collaboratively to extract the blur representation 124 and noise representation 126, respectively. These dual degradation representations later assist the subsequent super-resolution network in effectively enhancing the image and producing a high-quality high-resolution output 212.

After obtaining the blur representation 124 and noise representation 126 from the dual branch degradation extractor 100, the conditional super resolution network 205 utilizes these representations to perform adaptive restorations for the low resolution image 102. The dual branch super resolution network 200 is flexible, as the backbone of the conditional super resolution network 205 is replaceable. However, modifications are still necessary to accommodate the two representations 124, 126 as extra conditions. Each of the conditional blocks 202 is used as the building block where the blur representation 124 and noise representation 126 are inputted. In the embodiment, the conditional blocks 202 are used in degradation aware super resolution (DASR) and content and degradation aware super resolution network (CDSR) with modifications. DASR and CDSR have already realized an adaptive super resolution network to integrate information from the blur representation 124. The embodiment introduces noise representation 126 by adding a side network. The side network stretches the noise representation 126 to match the size of the first tensor 204 for inputting to the conditional blocks 202 of the conditional super resolution network 205. Next, the noise representation 126 and the first tensor 204 are inputted into the conditional super resolution network 205. This enables the dual branch super resolution network 200 to better account for the noise effect for different low resolution images 102 and dynamically improve the restoration results.

Figure 3:
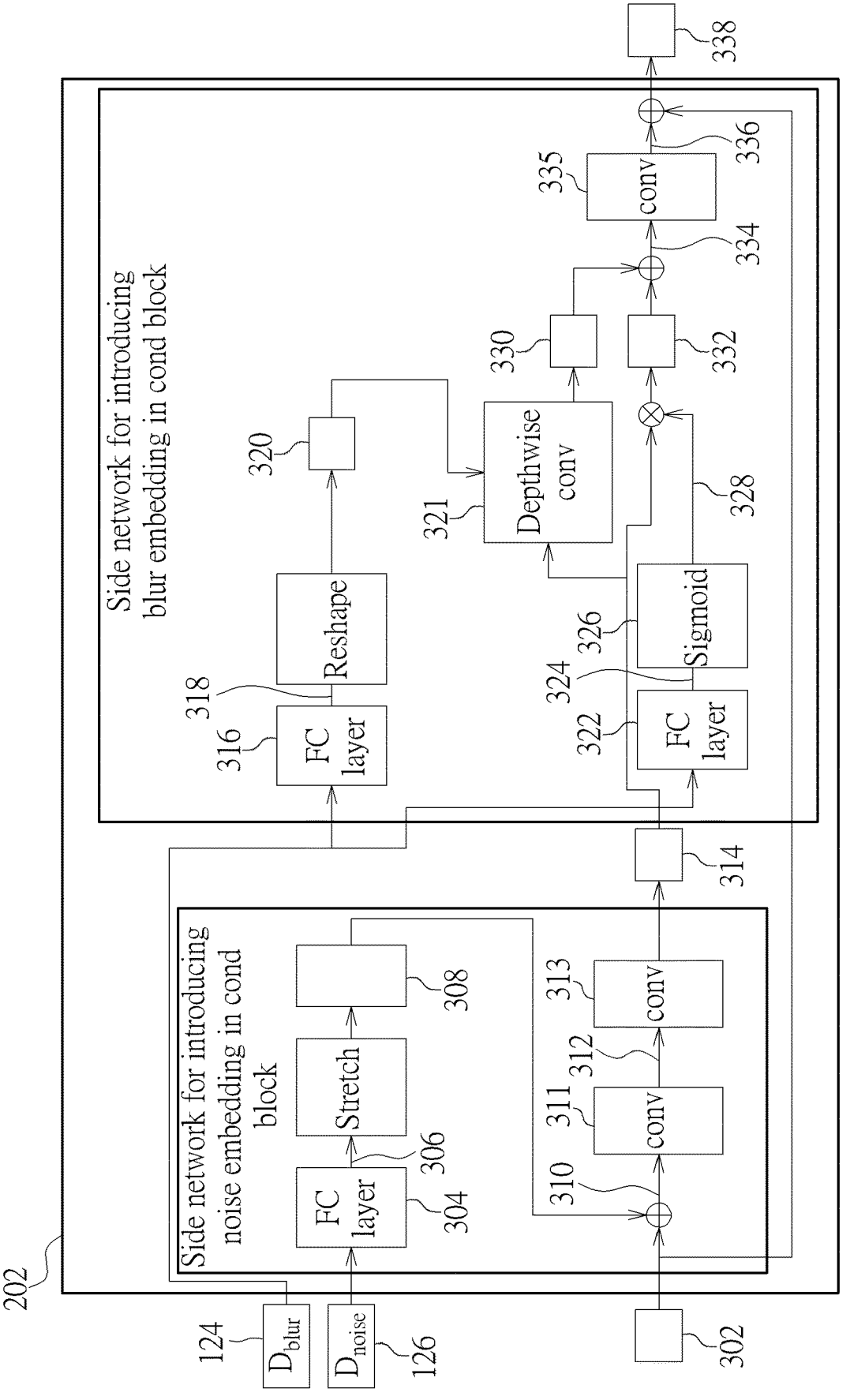
FIG. 3 is a block diagram of a conditional block in FIG. 2 based on a degradation aware super resolution (DASR) method.

FIG. 3 is a block diagram of a conditional block 202 based on a degradation aware super resolution (DASR) method. The noise representation 126 is inputted to first fully connected layers 304 to generate a fifth tensor 306. The fifth tensor 306 is stretched to generate a sixth tensor 308. If the conditional block 202 is the first conditional block 202 of the conditional super resolution network 205, the first tensor 204 is added with the sixth tensor 308 to generate a seventh tensor 310. If the conditional block 202 is not the first conditional block 202 of the conditional super resolution network 205, the tensor 302 outputted from the previous conditional block 202 is added with the sixth tensor 308 to generate the seventh tensor 310. The seventh tensor is inputted to a convolution layer 311 to generate an eighth tensor 312. The eighth tensor 312 is inputted to a convolution layer 313 to generate a ninth tensor 314. The blur representation 124 is inputted to second fully connected layers 316 to generate a tenth tensor 318. The tenth tensor 318 is reshaped to generate an eleventh tensor 320. The ninth tensor 314 and the eleventh tensor 320 are inputted to a depthwise convolution layer 321 to generate a twelfth tensor 330. The blur representation 124 is further inputted to third fully connected layers 322 to generate a thirteenth tensor 324. The thirteenth tensor 324 is inputted to a sigmoid activation function 326 to generate a fourteenth tensor 328. A convolution is performed on the ninth tensor 314 and the fourteenth tensor 328 to generate a fifteenth tensor 332. The twelfth tensor 330 is added with the fifteenth tensor 332 to generate a sixteenth tensor 334. The sixteenth tensor 334 is inputted to a convolution layer 335 to generate a seventeenth tensor 336. The first tensor 204 or the tensor 302 outputted from the previous conditional block 202 is added with the seventeenth tensor 336 to generate an eighteenth tensor 338. If the conditional block 202 is the last conditional block 202 of the conditional super resolution network 205, then the eighteenth tensor 338 is the second tensor 206.

Figure 4:
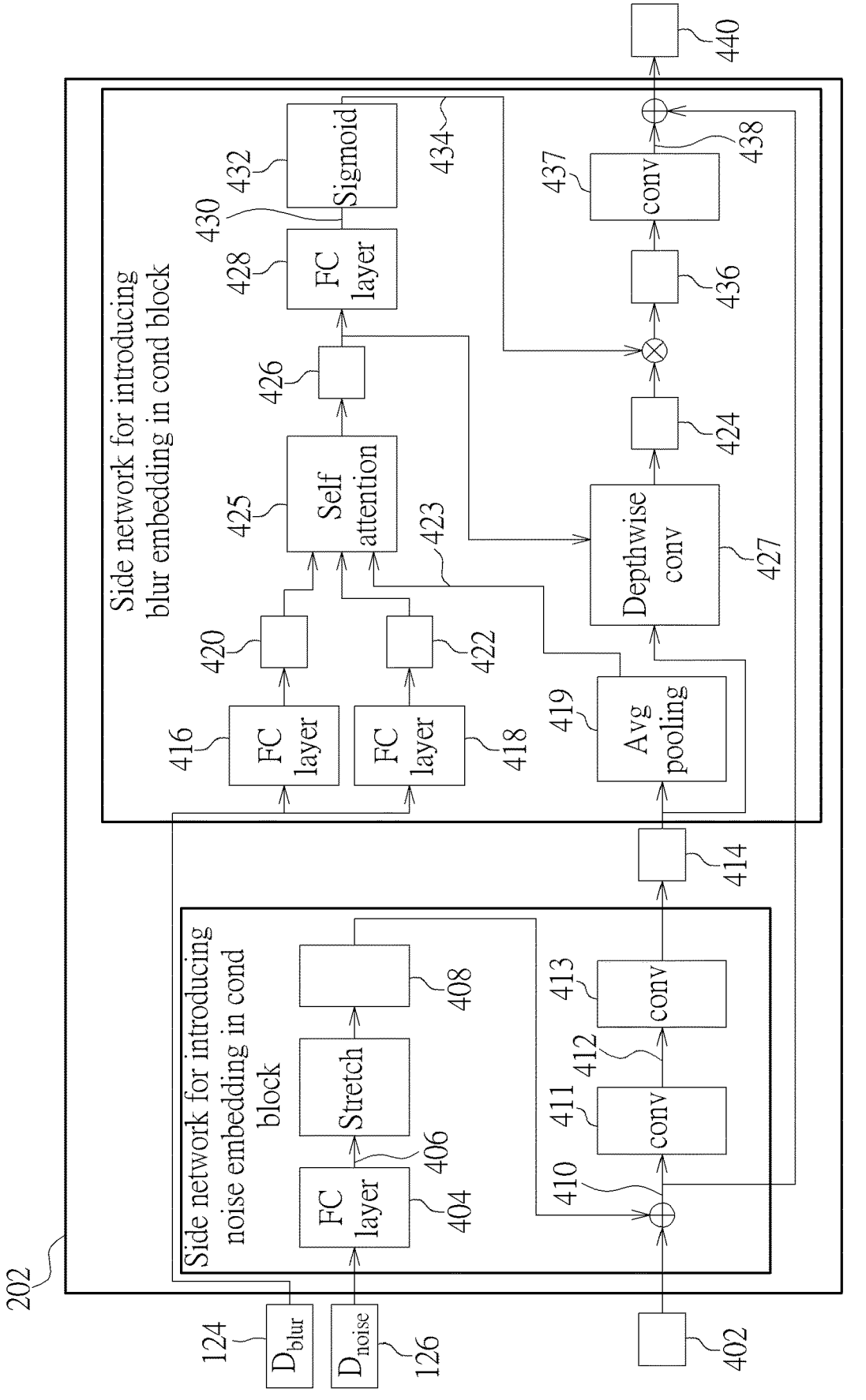
FIG. 4 is a block diagram of a conditional block in FIG. 2 based on a content and degradation aware super resolution network (CDSR) method.

FIG. 4 is a block diagram of a conditional block 202 based on a content and degradation aware super resolution network (CDSR) method. The noise representation 126 is inputted to fourth fully connected layers 404 to generate a nineteenth tensor 406. The nineteenth tensor 406 is stretched to generate a twentieth tensor 408. If the conditional block 202 is the first conditional block 202 of the conditional super resolution network 205, the first tensor 204 is added with the twentieth tensor 408 to generate a twenty-first tensor 410. If the conditional block 202 is not the first conditional block 202 of the conditional super resolution network 205, the tensor 402 outputted from the previous conditional block 202 is added with the twentieth tensor 408 to generate the twenty-first tensor 410. The twenty-first tensor 410 is inputted to a convolution layer 411 to generate a twenty-second tensor 412. The twenty-second tensor 412 is inputted to a convolution layer 413 to generate a twenty-third tensor 414. The blur representation 124 is inputted to fifth fully connected layers 416 and sixth fully connected layers 418 to generate a twenty-fourth tensor 420 and a twenty-fifth tensor 422 respectively. The twenty-third tensor 414 is inputted to an average pooling layer 419 to generate a twenty-sixth tensor 423. The twenty-fourth tensor 420, the twenty-fifth tensor 422, and the twenty-sixth tensor 423 are inputted to a self-attention layer 425 to generate a twenty-seventh tensor 426. The twenty-seventh tensor 426 and the twenty-third tensor 414 are inputted to a depthwise convolution layer 427 to generate a twenty-eighth tensor 424. The twenty-seventh tensor 426 is inputted to seventh fully connected layers 428 to generate a twenty-ninth tensor 430. The twenty-ninth tensor 430 is inputted to a sigmoid activation function 432 to generate a thirtieth tensor 434. A convolution is performed on the twenty-eighth tensor 424 and the thirtieth tensor 434 to generate a thirty-first tensor 436. The thirty-first tensor 436 is inputted to a convolution layer 437 to generate a thirty-second tensor 438. The thirty-second tensor 438 is added with the twenty-first tensor 410 to generate a thirty-third tensor 440. If the conditional block 202 is the last conditional block 202 of the conditional super resolution network 205, then the thirty-third tensor 440 is the second tensor 206.

Compared to the prior art, the dual branch degradation extractor 100 using normalized principle component analysis provides the blur representation 124 and the noise representation 126 to enhance blind super resolution. The blur representation 124 and the noise representation 126 are inputted to the conditional super resolution network 205 based on DASR or CDSR, improving the image restoration quality from the low resolution image 102.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for generating a high resolution image from a low resolution image comprising:

retrieving a plurality of low resolution image patches from the low resolution image;

performing discrete wavelet transform on each low resolution image patch to generate a first image patch with a high frequency on a horizontal axis and a high frequency on a vertical axis, a second image patch with a high frequency on the horizontal axis and a low frequency on the vertical axis, and a third image patch with a low frequency on the horizontal axis and a high frequency on the vertical axis;

inputting the first image patch, the second image patch and the third image patch to a dual branch degradation extractor to generate a blur representation and a noise representation; and performing contrastive learning on the blur representation and the noise representation by reducing a blur loss and a noise loss.

2. The method of claim 1 wherein the dual branch degradation extractor comprises a blur convolutional neural network (CNN) and a noise CNN, and inputting the first image patch, the second image patch and the third image patch to the dual branch degradation extractor to generate the blur representation and the noise representation comprises:

inputting the first image patch, the second image patch and the third image patch to the blur CNN to generate a blur degradation embedding;

performing a normalized principal component analysis on the blur degradation embedding to generate the blur representation;

inputting the first image patch, the second image patch and the third image patch to the noise CNN to generate a noise degradation embedding; and performing a normalized principal component analysis on the noise degradation embedding to generate the noise representation.

3. The method of claim 2 wherein performing the normalized principal component analysis on the blur degradation embedding to generate the blur representation comprises:

inputting the blur degradation embedding to a multilayer perceptron (MLP) to generate a blur query vector;

normalizing the blur query vector to generate a normalized blur query vector;

inputting a codebook degradation representation to a multilayer perceptron (MLP) to generate a blur codebook vector;

normalizing the blur codebook vector to generate a normalized blur codebook vector;

performing a softmax activation function on a dot product of the normalized blur query vector and a transpose of the normalized blur codebook vector to generate a blur probability vector; and performing a dot product on the blur probability vector and the blur codebook vector to generate the blur representation.

4. The method of claim 2 wherein performing the normalized principal component analysis on the noise degradation embedding to generate the noise representation comprises:

inputting the noise degradation embedding to a multilayer perceptron (MLP) to generate a noise query vector;

normalizing the noise query vector to generate a normalized noise query vector;

inputting a codebook degradation representation to a multilayer perceptron (MLP) to generate a noise codebook vector;

normalizing the noise codebook vector to generate a normalized noise codebook vector;

performing a softmax activation function on a dot product of the normalized noise query vector and a transpose of the normalized noise codebook vector to generate a noise probability vector; and performing a dot product on the noise probability vector and the noise codebook vector to generate the noise representation.

5. The method of claim 1 further comprising:

inputting the low resolution image to a convolution layer to generate a first tensor;

inputting the first tensor, the blur representation and the noise representation to a conditional super resolution network to generate a second tensor;

inputting the second tensor to a convolution layer to generate a third tensor;

adding the first tensor and the third tensor to generate a fourth tensor; and upsampling the fourth tensor to generate a super resolution image.

6. The method of claim 5 wherein the conditional super resolution network comprises N conditional blocks, and the method further comprising in a first conditional block of the N conditional blocks:

inputting the noise representation to first fully connected layers to generate a fifth tensor;

stretching the fifth tensor to generate a sixth tensor;

adding the first tensor with the sixth tensor to generate a seventh tensor;

inputting the seventh tensor to a convolution layer to generate an eighth tensor;

inputting the eighth tensor to a convolution layer to generate a ninth tensor;

inputting the blur representation to second fully connected layers to generate a tenth tensor;

reshaping the tenth tensor to generate an eleventh tensor;

performing depthwise convolution on the ninth tensor and the eleventh tensor to generate a twelfth tensor;

inputting the blur representation to third fully connected layers to generate a thirteenth tensor;

inputting the thirteenth tensor to a sigmoid activation function to generate a fourteenth tensor;

performing convolution on the ninth tensor and the fourteenth tensor to generate a fifteenth tensor;

adding the twelfth tensor with the fifteenth tensor to generate a sixteenth tensor;

inputting the sixteenth tensor to a convolution layer to generate a seventeenth tensor; and adding the first tensor with the seventeenth tensor to generate an eighteenth tensor;

wherein N is an integer greater than 1.

7. The method of claim 5 wherein the conditional super resolution network comprises N conditional blocks, and the method further comprising in an nth conditional block of the N conditional blocks:

inputting the noise representation to first fully connected layers to generate a fifth tensor;

stretching the fifth tensor to generate a sixth tensor;

adding a tensor outputted from an (n−1)th conditional block of the N conditional blocks with the sixth tensor to generate a seventh tensor;

inputting the seventh tensor to a convolution layer to generate an eighth tensor;

inputting the eighth tensor to a convolution layer to generate a ninth tensor;

inputting the blur representation to second fully connected layers to generate a tenth tensor;

reshaping the tenth tensor to generate an eleventh tensor;

performing depthwise convolution on the ninth tensor and the eleventh tensor to generate a twelfth tensor;

inputting the blur representation to third fully connected layers to generate a thirteenth tensor;

inputting the thirteenth tensor to a sigmoid activation function to generate a fourteenth tensor;

performing convolution on the ninth tensor and the fourteenth tensor to generate a fifteenth tensor;

adding the twelfth tensor with the fifteenth tensor to generate a sixteenth tensor;

inputting the sixteenth tensor to a convolution layer to generate a seventeenth tensor; and adding the tensor outputted from the (n−1)th conditional block of the N conditional blocks with the seventeenth tensor to generate an eighteenth tensor;

wherein N>n>1, N and n are integers.

8. The method of claim 5 wherein the conditional super resolution network comprises N conditional blocks, and the method further comprising in an Nth conditional block of the N conditional blocks:

inputting the noise representation to first fully connected layers to generate a fifth tensor;

stretching the fifth tensor to generate a sixth tensor;

adding a tensor outputted from an (N−1)th conditional block of the N conditional blocks with the sixth tensor to generate a seventh tensor;

inputting the seventh tensor to a convolution layer to generate an eighth tensor;

inputting the eighth tensor to a convolution layer to generate a ninth tensor;

inputting the blur representation to second fully connected layers to generate a tenth tensor;

reshaping the tenth tensor to generate an eleventh tensor;

performing depthwise convolution on the ninth tensor and the eleventh tensor to generate a twelfth tensor;

inputting the blur representation to third fully connected layers to generate a thirteenth tensor;

inputting the thirteenth tensor to a sigmoid activation function to generate a fourteenth tensor;

performing convolution on the ninth tensor and the fourteenth tensor to generate a fifteenth tensor;

adding the twelfth tensor with the fifteenth tensor to generate a sixteenth tensor;

inputting the sixteenth tensor to a convolution layer to generate a seventeenth tensor; and adding the tensor outputted from the (N−1)th conditional block of the N conditional blocks with the seventeenth tensor to generate the second tensor;

wherein N is an integer greater than 1.

9. The method of claim 5 wherein the conditional super resolution network comprises N conditional blocks, and the method further comprising in a first conditional block of the N conditional blocks:

inputting the noise representation to fourth fully connected layers to generate a nineteenth tensor;

stretching the nineteenth tensor to generate a twentieth tensor;

adding the first tensor with the twentieth tensor to generate a twenty-first tensor;

inputting the twenty-first tensor to a convolution layer to generate a twenty-second tensor;

inputting the twenty-second tensor to a convolution layer to generate a twenty-third tensor;

inputting the blur representation to fifth fully connected layers and sixth fully connected layers to generate a twenty-fourth tensor and a twenty-fifth tensor respectively;

inputting the twenty-third tensor to an average pooling layer to generate a twenty-sixth tensor;

inputting the twenty-fourth tensor, the twenty-fifth tensor, and the twenty-sixth tensor to a self-attention layer to generate a twenty-seventh tensor;

performing depthwise convolution on the twenty-seventh tensor and the twenty-third tensor to generate a twenty-eighth tensor;

inputting the twenty-seventh tensor to seventh fully connected layers to generate a twenty-ninth tensor;

inputting the twenty-ninth tensor to a sigmoid activation function to generate a thirtieth tensor;

performing convolution on the twenty-eighth tensor and the thirtieth tensor to generate a thirty-first tensor;

inputting the thirty-first tensor to a convolution layer to generate a thirty-second tensor; and adding the thirty-second tensor with the twenty-first tensor to generate a thirty-third tensor;

wherein N is an integer greater than 1.

10. The method of claim 5 wherein the conditional super resolution network comprises N conditional blocks, and the method further comprising in an nth conditional block of the N conditional blocks:

inputting the noise representation to fourth fully connected layers to generate a nineteenth tensor;

stretching the nineteenth tensor to generate a twentieth tensor;

adding a tensor outputted from an (n−1)th conditional block of the N conditional blocks with the twentieth tensor to generate a twenty-first tensor;

inputting the twenty-first tensor to a convolution layer to generate a twenty-second tensor;

inputting the twenty-second tensor to a convolution layer to generate a twenty-third tensor;

inputting the blur representation to fifth fully connected layers and sixth fully connected layers to generate a twenty-fourth tensor and a twenty-fifth tensor respectively;

inputting the twenty-third tensor to an average pooling layer to generate a twenty-sixth tensor;

inputting the twenty-fourth tensor, the twenty-fifth tensor, and the twenty-sixth tensor to a self-attention layer to generate a twenty-seventh tensor;

performing depthwise convolution on the twenty-seventh tensor and the twenty-third tensor to generate a twenty-eighth tensor;

inputting the twenty-seventh tensor to seventh fully connected layers to generate a twenty-ninth tensor;

inputting the twenty-ninth tensor to a sigmoid activation function to generate a thirtieth tensor;

performing convolution on the twenty-eighth tensor and the thirtieth tensor to generate a thirty-first tensor;

inputting the thirty-first tensor to a convolution layer to generate a thirty-second tensor; and adding the thirty-second tensor with the twenty-first tensor to generate a thirty-third tensor;

wherein N>n>1, N and n are integers.

11. The method of claim 5 wherein the conditional super resolution network comprises N conditional blocks, and the method further comprising in an Nth conditional block of the N conditional blocks:

inputting the noise representation to fourth fully connected layers to generate a nineteenth tensor;

stretching the nineteenth tensor to generate a twentieth tensor;

adding a tensor outputted from an (N−1)th conditional block of the N conditional blocks with the twentieth tensor to generate a twenty-first tensor;

inputting the twenty-first tensor to a convolution layer to generate a twenty-second tensor;

inputting the twenty-second tensor to a convolution layer to generate a twenty-third tensor;

inputting the blur representation to fifth fully connected layers and sixth fully connected layers to generate a twenty-fourth tensor and a twenty-fifth tensor respectively;

inputting the twenty-third tensor to an average pooling layer to generate a twenty-sixth tensor;

inputting the twenty-fourth tensor, the twenty-fifth tensor, and the twenty-sixth tensor to a self-attention layer to generate a twenty-seventh tensor;

performing depthwise convolution on the twenty-seventh tensor and the twenty-third tensor to generate a twenty-eighth tensor;

inputting the twenty-seventh tensor to seventh fully connected layers to generate a twenty-ninth tensor;

inputting the twenty-ninth tensor to a sigmoid activation function to generate a thirtieth tensor;

performing convolution on the twenty-eighth tensor and the thirtieth tensor to generate a thirty-first tensor;

inputting the thirty-first tensor to a convolution layer to generate a thirty-second tensor; and adding the thirty-second tensor with the twenty-first tensor to generate the second tensor;

wherein N is an integer greater than 1.

* * * * *